Jan. 1, 1924. 1,479,411
M. HARLOE
RESILIENT WHEEL
Original Filed Feb. 24, 1919
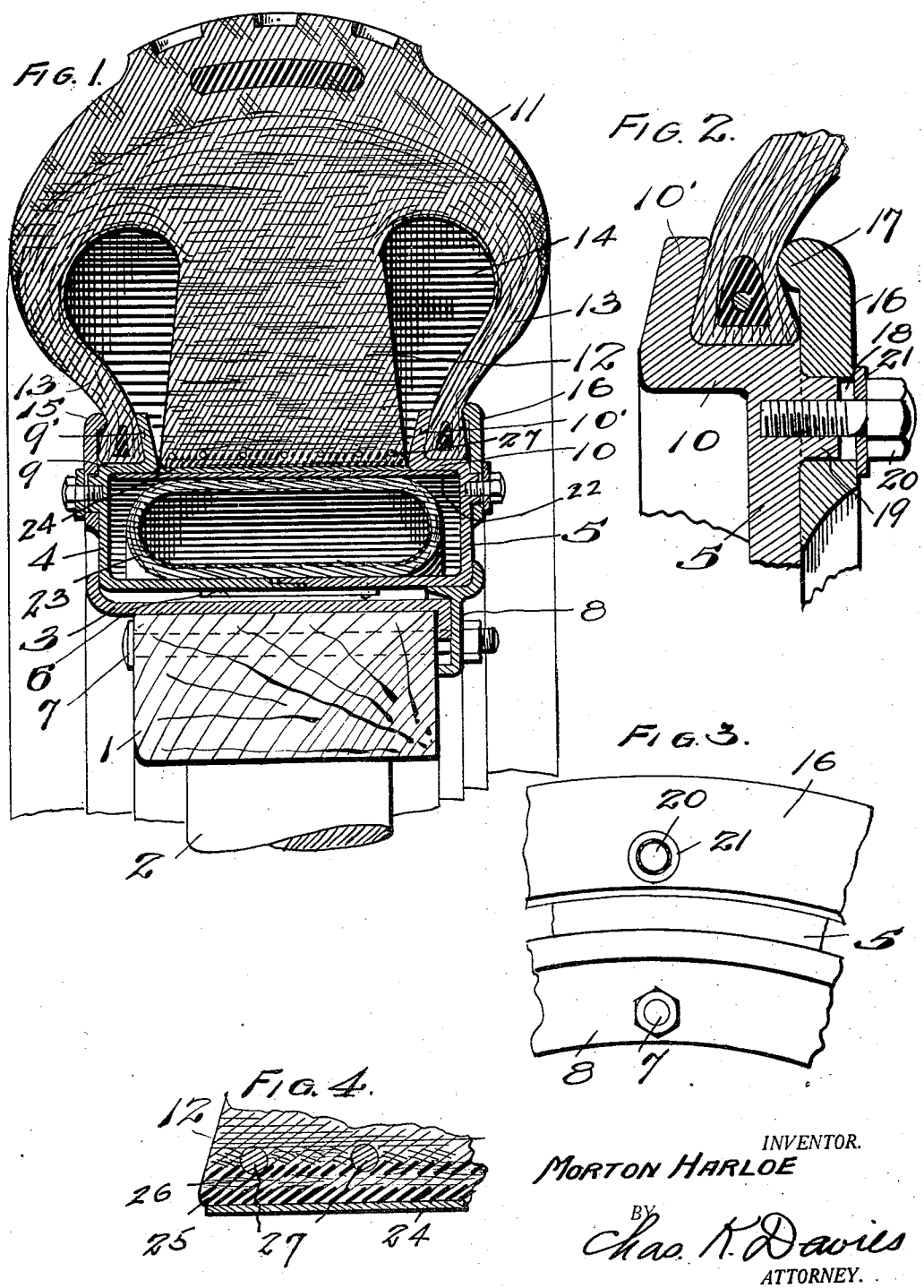
INVENTOR.
MORTON HARLOE
BY
Chas. K. Davies
ATTORNEY.

Patented Jan. 1, 1924.

1,479,411

UNITED STATES PATENT OFFICE.

MORTON HARLOE, OF WINCHESTER, VIRGINIA.

RESILIENT WHEEL.

Application filed February 24, 1919, Serial No. 278,825. Renewed October 29, 1923.

*To all whom it may concern:*

Be it known that MORTON HARLOE, a citizen of the United States of America, residing at Winchester, in the county of Frederick and State of Virginia, has invented certain new and useful Improvements in Resilient Wheels, of which the following is a specification.

The present invention relates to improvements in resilient wheels for automobiles, trucks, and other vehicles, and is designed to provide a durable, strong, and comparatively inexpensive wheel of this type for receiving and absorbing the strain from a loaded vehicle and for absorbing shocks and jerks in traveling due to irregularities in the road bed.

The invention consists in certain novel combinations and arrangements of parts involving the mounting of a novel form of tire upon the resilient member within the hollow rim, and in certain novel features of construction of the tire, its rim and the fastening means securing these parts together, as will be hereinafter more fully pointed out and claimed.

In the accompanying drawings one complete example of the physical embodiment of my invention is shown, constructed and arranged according to the best mode I have so far devised for the practical application of the principles of the invention.

In the actual construction of the wheel certain changes may be made to adapt the wheel to different conditions, but these changes will be within the scope of my claim and will not depart from the spirit of the invention.

Figure 1 is a transverse sectional view through the wheel tire rim etc.

Figure 2 is an enlarged view showing in detail section the means of securing the bead of the side wall between the retaining flange and the clincher ring.

Figure 3 is a view in side elevation of a portion of the tire retaining members.

Figure 4 is an enlarged detail view showing the construction of the web of the body of the flexible tire.

In the preferred form of the invention as depicted in the drawings, I have utilized the usual form of wood felly 1 and spokes 2 together with the usual iron band 3 which is shrunk on the felly and formed with a side flange for the rim section 4, which, together with the complementary section 5, forms the hollow, open, sectional rim, that may be temporarily locked together by means of a hook 6 pivoted on one of the sections and adapted to engage a pin on the other section to hold these sections together when off the wheel for any purpose.

The long bolts 7 spaced around the felly pass through the felly and also through dogs 8 spaced as usual around the wheel to clinch the sectional rim between the dogs and the flanged felly band 3, and by this means the rim is rigidly and securely held to the felly.

The rim sections are each formed with a transverse annular flange as 9 and 10 extending inwardly toward each other, but leaving a wide opening for the space within the hollow rim, and then these flanges are fashioned with a pair of abutment flanges as 9' and 10' which project outwardly from the rim, and are slightly inclined toward the outer side of the rim.

The tire which is designated as a whole by the numeral 11 is fashioned with a central, annular web 12 and side walls 13, 13 forming between the webs and the walls annular spaces 14 for air.

The edges of the walls are beaded as usual and they fit snugly against the abutments 9' and 10' and are retained there by the two side rings 15 and 16 respectively, each of the retainer rings being provided with a bead 17 at the inner side of its outer edge to engage against the bead of the tire walls and secure a firm engagement therewith.

Each of the retainer rings has spaced around its outer face a number of openings 18 to fit over the complementary threaded bosses 19 which project from the outer walls of the rim sections 4 and 5 and are adapted to receive the retaining bolts 20 which bear against the washers 21. In the enlarged Figure 2 it will be noted that the depth of the bosses is not as great as the width retainer ring and therefore the boss is not in the way of securing a tight retaining engagement of the bead 17 with the bead of the side wall of the tire 11. The tire is thus supported at the edges of its side walls upon a solid and firm and inflexible foundation, but the web or body of the tire 12 is supported upon a flexible and resilient foundation or spring ring 22 which is retained within the hollow rim by the two rim flanges 9 and 10 with sufficient freedom as to be flexed therein when under a load. To reinforce the steel spring ring when equipping the heavier cars, an air tube 23 may be employed in the hollow rim, under the steel spring ring, and inasmuch as this tube does not come in contact with the side walls of the hollow rim it will readily be apparent that this canvas and rubber tubing is well protected against wear and is therefore very durable.

The base of the web of the tire is built up with a special view to preventing wear on the parts, and for this purpose an inner band of steel or other suitable material as 24, which is resilient and flexible, is utilized for the first layer of rubber which is vulcanized thereon. Upon the vulcanized rubber a layer of rubberized canvas is then placed, the rubber being indicated as 25 and the canvas as 26 in Figure 4. Upon the rubber-canvas a series of circumferentially extending rings 27 are placed spaced suitable distances apart and their ends brazed or twisted together, and these rings, which may be of wire, form a corrugated surface for the filling of gum and canvas which forms the foundation of the layers of the web. From this point the web is built up of friction fabric or rubberized canvas, with a gum coating on the walls of the air spaces 14, and the side walls are also of this material, while the tread portion of the tire is of the usual composite material with the gum cushion therein.

What I claim is—

The combination with a sectional channel rim having opposed transverse flanges and opposed angular abutment flanges, of spaced, lateral threaded bosses on the rim sections, a resilient flexible ring retained by the transverse flanges, a flexible tire having a central web and an inner metallic resilient band vulcanized thereto supported on the resilient ring, said tire having side walls supported on the transverse flanges against the outer faces of the abutment flanges, clincher rings engaging the outer edges of the side walls and provided with perforations fitting over the bosses, and securing bolts in the clincher rings engaging the rim sections.

In testimony whereof I affix my signature.

MORTON HARLOE.